Nov. 8, 1932.   A. V. RUPPRECHT   1,886,593
POULTRY FEEDER
Filed April 30, 1931   2 Sheets-Sheet 1
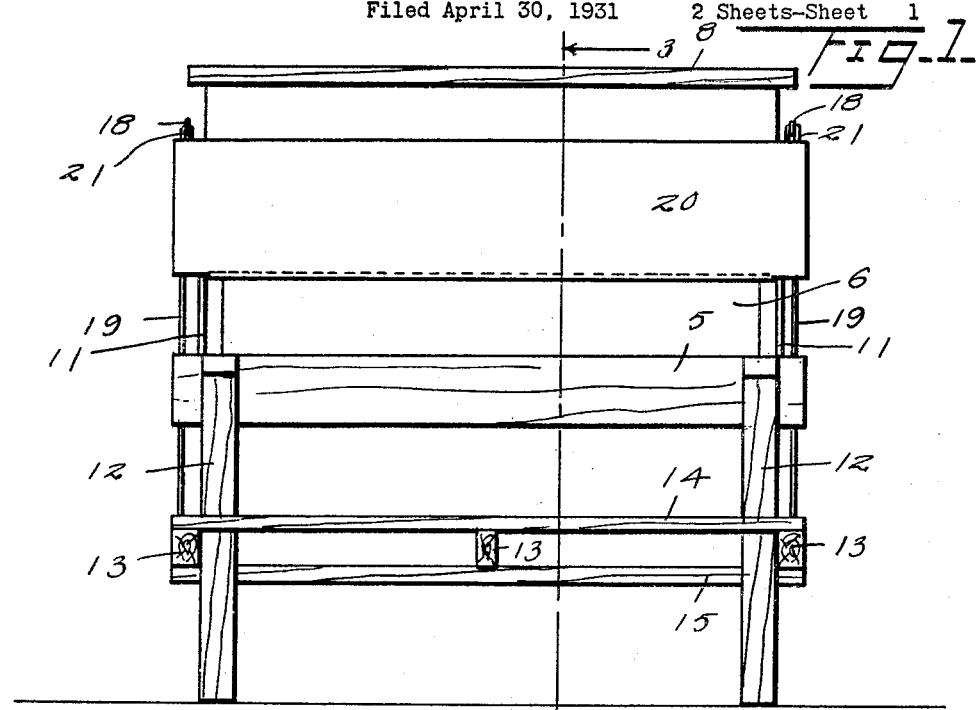
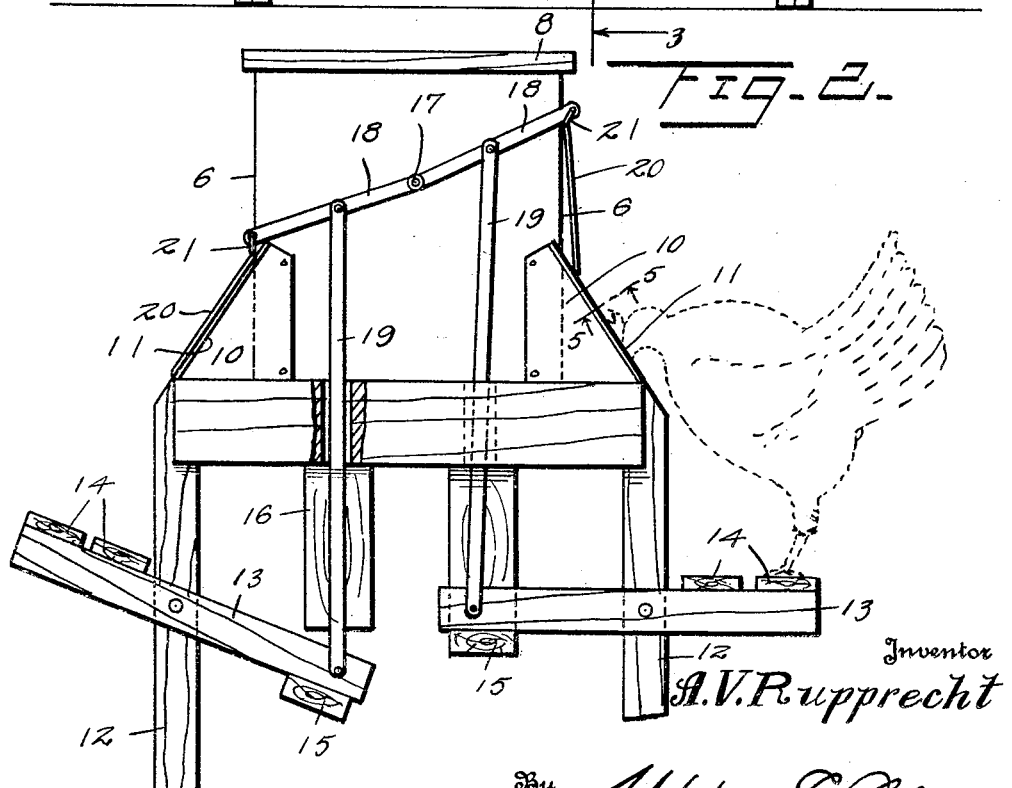
Inventor
A. V. Rupprecht
By Watson E. Coleman
Attorney Nov. 8, 1932.　　A. V. RUPPRECHT　　1,886,593

Figures 3, 4, 5:
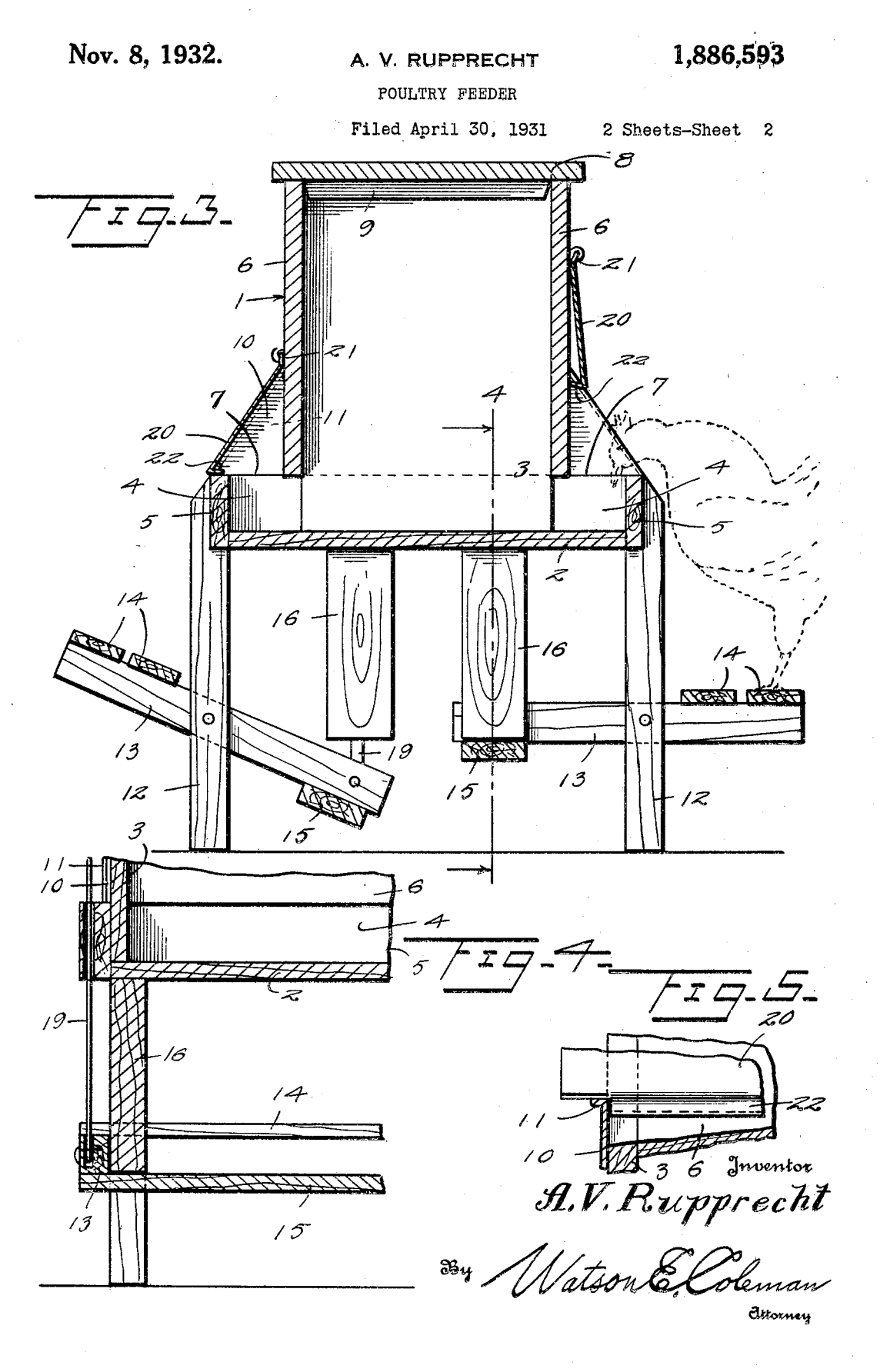

POULTRY FEEDER

Filed April 30, 1931　　2 Sheets-Sheet 2

Inventor
A. V. Rupprecht
By Watson E. Coleman
Attorney

Patented Nov. 8, 1932

1,886,593

UNITED STATES PATENT OFFICE

ALVIN V. RUPPRECHT, OF FAYETTEVILLE, ARKANSAS

POULTRY FEEDER

Application filed April 30, 1931. Serial No. 534,038.

This invention relates to the class of animal husbandry and pertains particularly to an improved feeder for poultry.

The primary object of the present invention is to provide a poultry feeder having a hopper and a trough associated therewith, in connection with which trough there is a cover which is removed from the trough by the poultry when they perch before the same to feed.

Another object of the invention is to provide a feeding device for poultry which will always remain covered when not in use so that the contents will remain clean and protected from birds and barnyard animals.

A still further object of the invention is to provide a poultry feeding device which has an oscillatable perch which is connected with the removable cover for a feeding trough, so that when fowls mount the perch the cover will be removed from the trough.

A still further object of this invention is to provide a feeding structure of the above described character which is of simple design, economical to manufacture and strong and durable.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claim.

In the drawings:—

Figure 1 is a view in side elevation of the structure embodying the present invention;

Figure 2 is a view in end elevation of the same;

Figure 3 is a vertical sectional view taken on the line 3—3 of Figure 1;

Figure 4 is a detailed sectional view taken on the line 4—4 of Figure 3;

Figure 5 is an enlarged detailed sectional view taken on the line 5—5 of Figure 2.

Referring now more particularly to the drawings wherein like numerals of reference designate corresponding parts throughout the several views, the numeral 1 indicates generally the feed container or hopper. This structure comprises a bottom 2 upon which are mounted end walls 3. Disposed transversely of each end wall and extending beyond the side edges thereof is a low wall 4. The bottom 2 is of a width greater than the end walls as shown and the end walls are disposed upon the bottom so that the side edges of the end wall will be positioned the same distance from the side edges of the bottom. The lower end walls 4 extend entirely across the bottom 2 and are connected by the vertical trough walls 5 which extend longitudinally of the bottom and which are of the same height as the low end walls 4.

Connecting the end walls 3 are side walls 6, the lower edges of which terminate in the plane of the top edges of the walls 4 and 5. There are thus formed the openings 7 through which access is had to the contents of the trough structure, the contents of the hopper flowing into each of the troughs beneath the lower edges of the bottom walls 6 as will be readily understood.

The top of the hopper is covered by a removable closure member 8, any suitable means being employed for maintaining this cover in position, such, for example, as the cleats 9 secured across the under face thereof.

At each end of the hopper and at each side, is a triangular plate 10, preferably of metal, which forms an angular end wall for the upper part of the adjacent trough. The inclined edges of the plates or wall 10 terminate at the outer corners of the front walls 5 of the troughs and these inclined edges have track ribs 11 thereon.

The hopper structure is supported at a suitable distance or height above the ground, by legs 12. Each of these legs has pivotally attached to its outer side, an oscillatable platform supporting arm 13. The two arms upon each each side of the structure are connected by the slats 14 which form a platform upon which poultry may perch. The inner ends of each pair of arms are connected by a bar 15 which runs lengthwise beneath the hopper and secured to and extending downwardly from the bottom of the hopper and stop members 16 with which the bars 15 engage when a fowl perches upon a platform, to limit the oscillatory movement of the arms so as to stop them in horizontal position.

At each end of the hopper body 1 there is secured upon the vertical center of the end wall a pivot pin 17 to which is attached one end of each of a pair of links 18. These links extend across the adjacent end walls, in opposite directions and project slightly beyond the adjacent sides as shown.

Each of the links 18 has pivotally attached thereto, intermediate its ends, one end of a lift rod 19, which passes downwardly through a suitable guide passage in the adjacent low end wall 7, to the underlying arm 13, with which its other end is pivotally connected.

Each of the troughs is closed by a sliding cover 20 the ends of which rest upon the tracks 11 of the adjacent triangular end wall plates 10. Each of these covers is connected by means of a suitable link 21, with the pair of links 18 adjacent thereto. The lower edge of each trough cover is turned inwardly as indicated at 22 and each end of this turned-in portion 22 is cut away slightly so that it will ride against the inner face of the adjacent end wall plate 10. This in-turned edge or flange 22 of each cover rests upon the wall 5 of the adjacent cover when the cover is down.

From the foregoing description it will be readily apparent that due to the fact that the pivot points for the arms 13 are upon the side of the transverse centers of the arms nearest the platforms 14, the inner ends of the arms, when the platforms are unoccupied, will swing downwardly and thus lower the covers 20. When a fowl perches upon one of the platforms its weight will be sufficient to oscillate the arms 13 to raise them to vertical position and this will lift the push arms 19 to cause the lifting of the links 18 and the cover 20 connected therewith. It will also be seen that as the covers 20 are raised and lowered they will ride at their lower edges upon the tracks 11, the turned-in flanges 22 serving to prevent longitudinal movement thereof. These flanges, as previously stated, rest upon the top edges of the trough walls 5, when the covers are down and thus make a tight joint between the covers and the trough to prevent the entrance of dirt and vermin thereto.

Having thus described the invention, what is claimed is:—

In a poultry feeder, a feed hopper having a bottom and a side wall terminating at a point above the bottom to provide a feed outlet, the said bottom being projected beyond the said side wall to provide a trough bottom, a vertical wall extending along a longitudinal edge of the trough bottom forming a trough front wall, end walls for the trough having top edges extending at an inclination from the trough front wall to the said side wall of the hopper to a point a substantial distance above the bottom edge thereof, a cover for the trough comprising a plate of greater length than the trough and having its ends resting against the inclined top edges of the trough end walls, means for preventing longitudinal movement of said plate on the trough comprising a flange along the lower edge of the plate which terminates at each end short of the adjacent plate end and which positions between the said trough end walls, said flange resting upon the top edge of the front wall of the trough when the plate is in trough covering position, and means operated by the weight of a fowl approaching the trough for sliding said cover plate upwardly along the inclined edges of the trough end walls.

In testimony whereof I hereunto affix my signature.

ALVIN V. RUPPRECHT.